Oct. 1, 1963 J. R. DOHERTY 3,105,281
SAFETY CLAMP
Filed Oct. 10, 1961 2 Sheets-Sheet 1
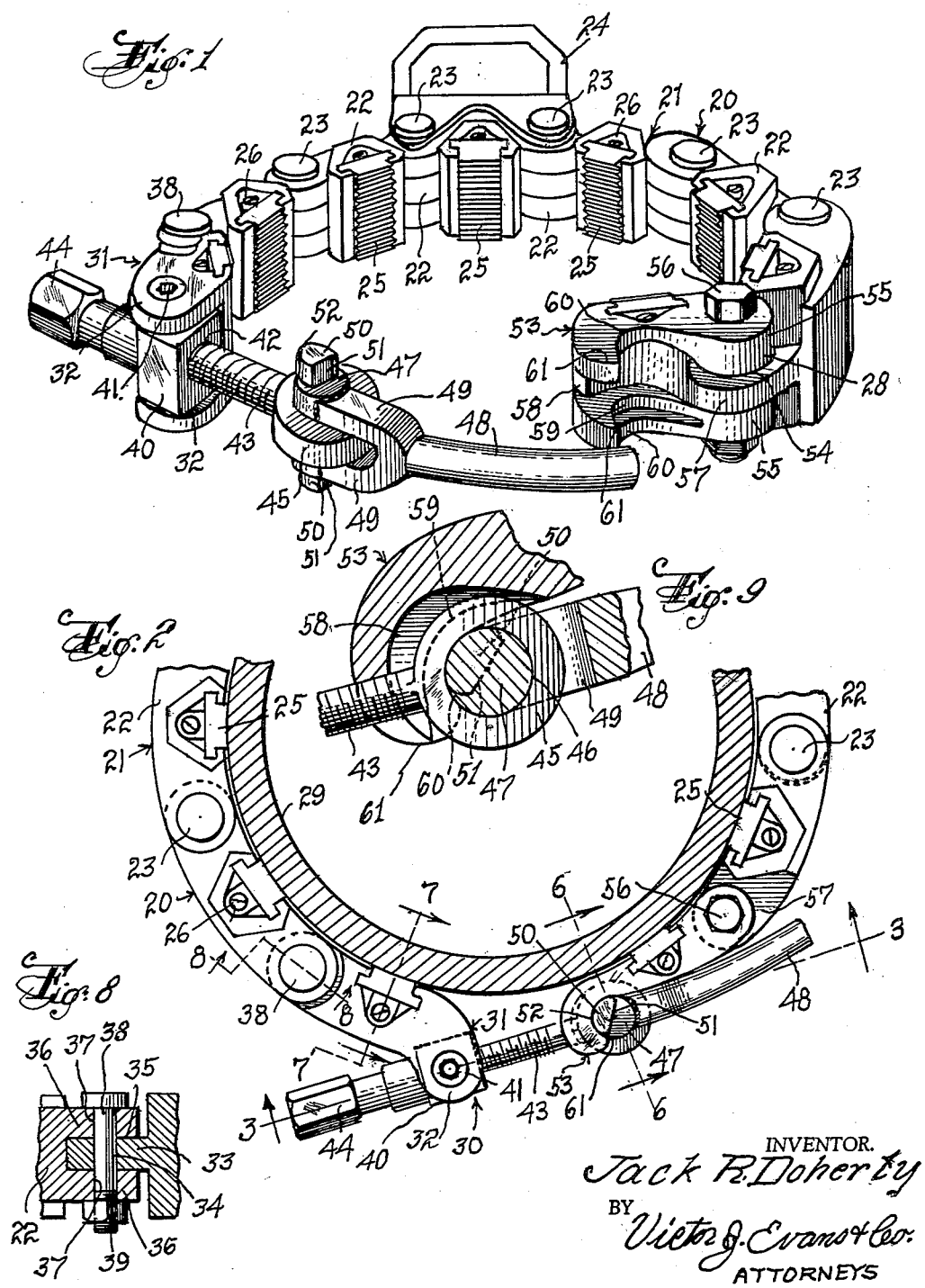
INVENTOR.
Jack R. Doherty
BY
Victor J. Evans & Co.
ATTORNEYS Oct. 1, 1963
J. R. DOHERTY
3,105,281
SAFETY CLAMP
Filed Oct. 10, 1961
2 Sheets-Sheet 2
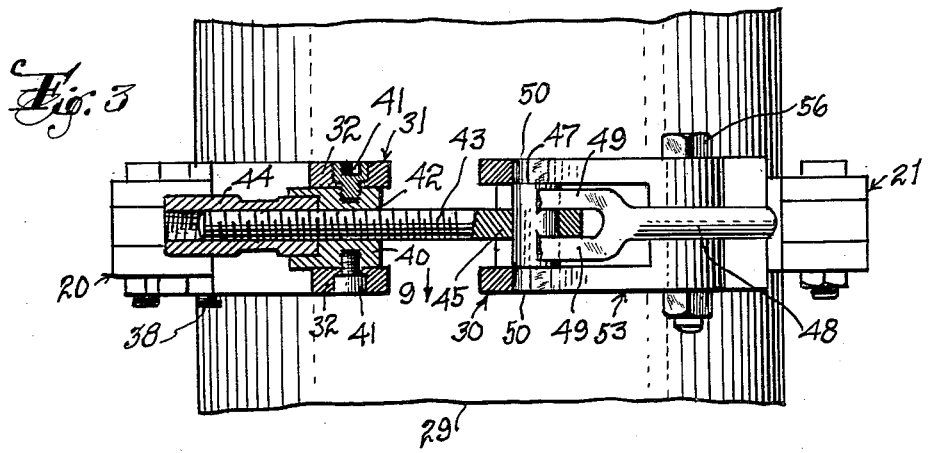
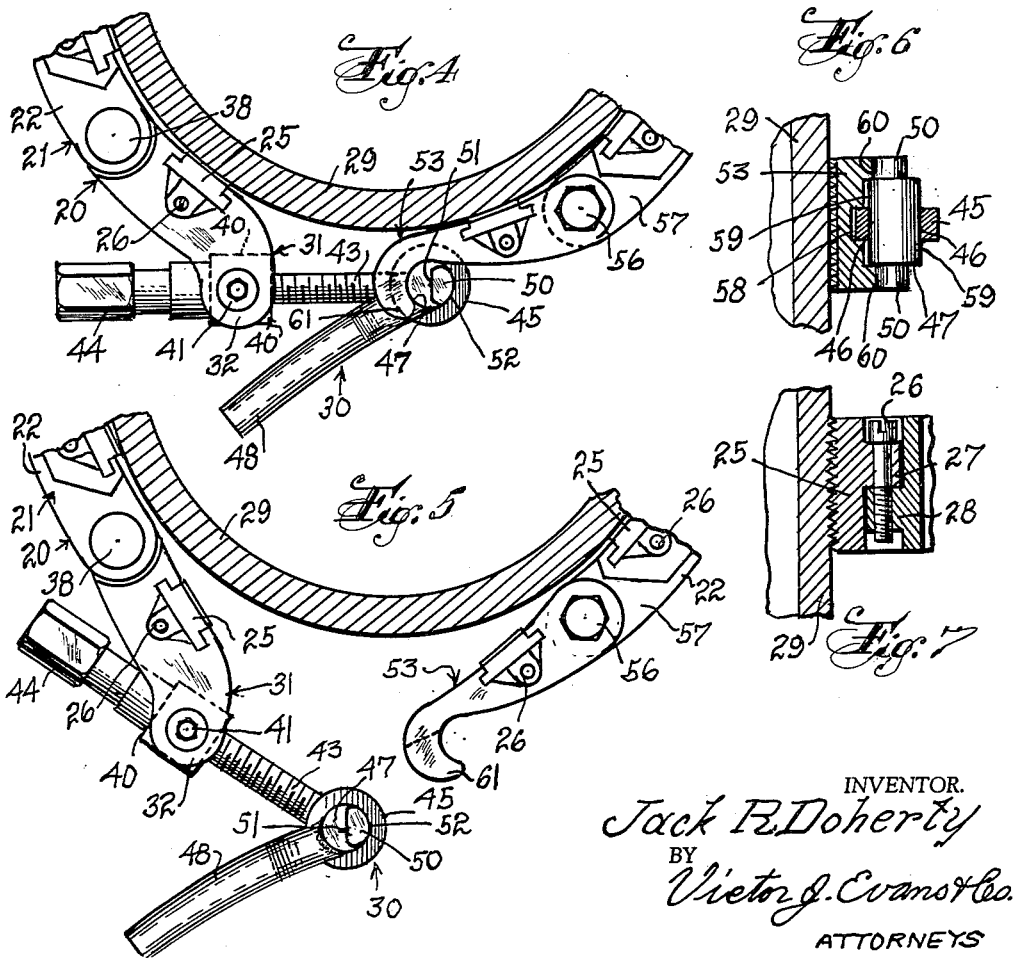
INVENTOR.
Jack R. Doherty
BY
Victor J. Evans & Co.
ATTORNEYS

United States Patent Office 3,105,281
Patented Oct. 1, 1963

3,105,281
SAFETY CLAMP
Jack R. Doherty, Odessa, Tex.
Filed Oct. 10, 1961, Ser. No. 144,193
1 Claim. (Cl. 24—249)

The present invention relates to a safety clamp for engaging or holding cylindrical members such as pipes used in connection with well drilling or the like, and more particularly to an improved latching and tightening means for a safety clamp.

An object of the present invention is to provide a safety clamp which includes an improved coupling means whereby the clamp can be readily and quickly connected or disconnected from a cylindrical member such as a pipe used in connection with well drilling tools or the like, and wherein the clamp of the present invention can be tightened so as to prevent accidental slippage or disengagement of the safety clamp from the pipe being lifted or lowered or otherwise handled.

Another object is to provide a safety clamp which includes a manually operable handle that can be used for actuating a cam mechanism so that the clamp can be readily latched or unlatched as desired or required.

A still further object is to provide an apparatus of the character described that may be utilized speedily and with precision by even inexperienced operators.

Further objects and advantages are to provide improved elements and arrangements thereof in a device of the character described that is economical to produce, durable in form, and conducive to the most economical use of materials and uniformity of members formed therefrom.

Still further objects and advantages will become apparent in the subsequent description in the specification.

In the drawings:

FIGURE 1 is a perspective view showing the safety clamp of the present invention in open position.

FIGURE 2 is a fragmentary plan view, with parts of a pipe in section, and with parts of the clamp broken away, and showing the safety clamp of the present invention locked in place on the pipe.

FIGURE 3 is a sectional view taken on the line 3—3 of FIGURE 2.

FIGURE 4 is a view generally similar to FIGURE 2 but showing the coupling in an unlocked or unlatched position as for example just prior to removing or mounting the clamp on a pipe.

FIGURE 5 is a view similar to FIGURE 4 but showing the coupling disengaged or disconnected so as to permit separation or disengagement of the safety clamp from the pipe.

FIGURE 6 is a sectional view taken on the line 6—6 of FIGURE 2.

FIGURE 7 is a sectional view taken on the line 7—7 of FIGURE 2.

FIGURE 8 is a sectional view taken on the line 8—8 of FIGURE 2.

FIGURE 9 is an enlarged sectional view taken on the line 9—9 of FIGURE 3.

Referring in detail to the drawings, the numeral 20 indicates the safety clamp of the present invention which is shown to comprise a linkage 21 which consists of a plurality of intermediate links 22 that are hingedly or pivotally connected together as at 23, and the linkage 21 may be provided with one or more hand grips 24 thereon, FIGURE 1. As shown in the drawings the links have connected thereto slips or gripping members 25 which are adapted to be operatively connected to corresponding links 22 as for example by means of bolts or screws 26 which are adapted to engage interfitting apertured lugs or shoulders 27 and 28, FIGURE 7. In the drawings the numeral 29 indicates a cylindrical member such as a pipe used in connection with well drilling work, that is being gripped by the safety clamp 20 of the present invention.

According to the present invention there is provided an improved coupling means 30 for releasably connecting the ends of the linkage 21 together, and the coupling means 30 embodies or comprises an end piece 31 which is shaped to include a pair of spaced parallel lugs 32 on one end thereof, and the other end of the end piece 31 is provided with a finger 33 which has an aperture 34 therein. The link 22 adjacent the end piece 31 is bifurcated as at 35 wherein there is defined or provided in the link adjacent the end piece 31, a pair of spaced parallel sections 36 which have apertures 37 that register with the aperture 34 in the finger 33, and a pin or bolt 38 extends through registering apertures 37 and 34 for pivotally connecting the end piece 31 to the adjacent link 22, and a nut 39 may be arranged in threaded engagement with an end of the bolt 38, FIGURE 8.

As shown in the drawings, a block 40 is mounted between the lugs 32 of the end piece 31, FIGURE 3, and the block 40 is swivelly connected to the lugs 32 by means of screws or pins 41. The block 40 is provided with an opening 42 therein, and the numeral 43 indicates a screw member which extends through the opening 42, and a nut or retainer 44 is arranged in threaded engagement with the threaded portion of the screw member 43. The screw member 43 has an eye of circular formation on an end thereof as indicated by the numeral 45, and the eye 45 has a central circular opening 46 therein, FIGURE 6. The numeral 47 indicates a pin of cylindrical formation, and the pin 47 is rotatably arranged in the opening 46 of the eye 45, and there is provided a lever or handle 48 which has a U-shaped portion 49 that straddles the eye 45, and the U-shaped portion 49 is secured as by welding to end portions of the pins 47, FIGURE 1. Cams 50 are secured to or formed integral with the ends of the pins 47, and the cams 50 are arranged off center with respect to the end portions of the pins 47, and as shown in the drawings, the cams 50 include a flat surface 51 as well as an arcuate surface 52, for a purpose to be later described.

The numeral 53 indicates a body member arranged on the opposite end of the linkage 21 from the end piece 31, and the body member 53 has an end portion thereof bifurcated as at 54 wherein there is defined or provided a pair of spaced parallel apertured portions 55 which define a slot therebetween for receiving a finger or lug 57 of an adjacent link 22, and the numeral 56 indicates a bolt or pin which is adapted to extend through registering apertures in the portions 55 and through a corresponding registering aperture in the finger 57 whereby the body member 53 is swivelly or pivotally connected to the adjacent link 22.

As shown in the drawings, the body member 53 has a stepped formation so that there is provided or defined an intermediate recessed portion 58, and arranged on opposite sides of the intermediate recessed portion 58 are shoulders 59, and arranged adjacent the shoulders 59 are arcuate end surfaces 60. The body member 53 is further shaped to include a pair of spaced parallel hook portions 61. The recessed portion 58 is adapted to receive therein a portion of the eye 45, and the shoulders 59 are adapted to receive therein end portions of the pins 47, and the end surfaces 60 are adapted to receive or engage portions of the diametrically opposed cams 50. The hook portions 60 are adapted to coact with surfaces of the cams 50 so that for example with the parts in the position of FIGURE 2 the safety clamp will be latched or locked on a member such as the pipe 29 so that the pipe can be handled in the desired manner.

From the foregoing, it is apparent that there has been provided a safety clamp which is especially suitable for use in gripping pipes such as pipes used in connection with various types of drilling activities and in use with the parts arranged as shown in the drawings, it will be seen that when the parts are in the position of FIGURE 2, the clamp 20 has its coupling mechanism 30 latched or locked on the pipe 29, while when the parts are in the position of FIGURE 4, the coupling mechanism is in an unlatched position ready to be latched or ready to be removed from the pipes. FIGURE 5 illustrates the position of the parts before the coacting elements are brought together.

It is to be noted that with the parts in a position such as that shown in FIGURE 5, when the clamp is to be latched or locked on a cylindrical member such as the pipe 29, it is only necessary to bring the parts together from the position shown in FIGURE 5 to a position such as that shown in FIGURE 4 wherein the end portions of the pins 47 will be engaged with the shoulders 59 as shown in FIGURE 6, and then by manually rotating the handle 48 in a counter-clockwise position from the position shown in FIGURE 4 to the position shown in FIGURE 2, the pin 47 will be rotated in the openings 46 of the eye 45 whereby the arcuate surfaces 52 of the cams 50 will move into locking engagement with the end surfaces 60 and hooks 61 so that accidental separation or disengagement of the parts will be prevented. With the parts in the locked position of FIGURE 2, the clamp can be used to facilitate raising or lowering or shifting of a member such as the pipe 29 for any desired or required purpose.

When it is desired to unlatch or disconnect the clamp, the reverse procedure is followed. That is with the parts in the locked position of FIGURE 2, to unlatch the mechanism, the handle 48 can be manually gripped and rotated in a clockwise direction from the position shown in FIGURE 2 to a position such as that shown in FIGURE 4 and this clockwise rotation or movement of the handle 48 will cause corresponding clockwise rotation of the pin 47 in the opening 46 whereby the off-center arranged cams 50 will be shifted out of engagement with the hook portions 61 so that the parts can be separated as for example the parts can be moved to a position such as that shown in FIGURE 5. The flat surfaces or cutaway surfaces 51 on the cams provide sufficient clearance so as to permit the cams to readily move to and from positions such as that shown in FIGURES 4 and 5.

The hook portions 61 have sufficient curvature so that with the parts in the locked position of FIGURE 2, the arcuate surfaces 52 of the cams 50 will coact with the surfaces 60 and with the hook portions 61 so that the mechanism will not inadvertently become loose or unlocked. That is, to unlock the mechanism it is necessary to first manually move the handle 48 from a position such as that shown in FIGURE 2 to a position such as that shown in FIGURE 4, so that it will be seen that the mechanism of the present invention has a safety construction wherein accidental opening of the clamping mechanism will be prevented or minimized.

The eye or circular portion 45 is secured to or formed integral with an end of the screw member 43, and this eye 45 has the opening 46 which permits the necessary rotation of the pin 47 during latching or unlatching of the device. The screw member 43 extends through an opening 42 in the block 40, and the block 40 is swivelly connected to the portions 32 of the end piece 31 by means of the pins 41. By adjusting the position of the nut 44 on the screw member 43, the effective length of the screw member 43 can be varied or changed as desired so that this arrangement provides a means for permitting the clamp to be used with pipes of different diameters or sizes. The end piece 31 is swivelly connected to the adjacent link by means of a pin or bolt 38, and all of the various links are swivelly connected together, and in addition the body member 53 is swivelly or pivotally connected to an adjacent link by means of a bolt or pin 56, and this construction insures that the entire safety clamp of the present invention will have the necessary flexibility to properly clampingly engage a pipe or other member being handled.

The parts can be made of any suitable material and in different shapes or sizes.

The slips 25 are releasably connected to the various links as for example by means of bolts 26, so that by loosening and removing the bolts 26, the slips 25 can be removed and replaced, as for example when such slips become worn or damaged. These slips have teeth on the inner surfaces for tightly gripping the outer periphery or surface of a pipe being handled so as to help insure that there will be no slippage between the clamp of the present invention and the pipes being moved or gripped.

The present invention is an improvement over the safety clamp shown and described in prior Patent No. 2,301,625, and the present invention is especially directed to the construction of the coupling mechanism 30 which is an improvement over the coupling mechanism shown in this prior patent.

It will be seen that with the present invention an eccentric means is provided for tightening drill collar safety clamps, and the present invention is especially suitable for use in oil fields or the like. The coupling mechanism 30 is adapted to be used on a safety clamp such as that shown in prior Patent No. 2,301,625, and the coupling arrangement of the present invention permits speed and efficiency to be realized when using such clamps. The coupling mechanism 30 is adapted to be used with other types of clamps in addition to the one shown and described in prior Patent No. 2,301,625. When using the present invention one hand can be arranged in engagement with the lever 48 and the other hand can be arranged in engagement with the adjusting nut 44 and this permits a convenient means for compensating for differences in diameter of the drill collar.

It will be seen that the present invention is primarily a latching and tightening device for drill collar safety clamps used on rotary drilling rigs. The device hinges around an eccentric pin which, when turned, causes the distance between two separate parts to lessen thereby tightening the clamp which passes around the drill collar. The device can be made to fit different types of safety clamps.

Although the invention herein described is fully capable of achieving the objects and providing the advantages hereinabove mentioned, it is to be understood that it is merely illustrative of the presently preferred embodiment of the invention, and that it is not to be limited to the details of construction herein described other than as defined in the appended claim.

What is claimed is:

A safety clamp comprising linkage including a plurality of intermediate links having pipe engaging slips connected thereto, releasable coupling means for operatively connecting the ends of said links together, said coupling means comprising an end piece shaped to include a pair of spaced parallel lugs on one end thereof, an apertured finger on the other end of said end piece, the adjacent link being bifurcated so as to provide a pair of spaced parallel apertured sections having a slot therebetween for receiving said finger, a securing element extending through said apertured finger and apertured sections, a block mounted between the lugs of said end piece, fasteners swivelly connecting said lugs to said block, there being an opening in said block, a screw member extending through the opening in said block, and said screw member having a threaded portion, a retainer arranged in threaded engagement with the threaded portion of said screw member; an enlarged circular eye on an end of said screw member, said eye having a central circular opening therein, a cylindrical pin rotatably arranged in the opening of said eye, a handle having a U-shaped portion straddling said eye and said U-shaped portion being secured to said pin, cams arranged off-center on the ends of said pin, and said cams each including an arcuate surface and a flat surface; a body member having a bifurcated portion defining a pair of spaced parallel apertured portions and a slot therebetween, said slot receiving therein an apertured finger of an adjacent link, a securing element extending through said apertured portions and apertured finger, said body member having a stepped formation and including an intermediate recessed portion, shoulders contiguous to said recessed portion, end surfaces adjacent said shoulders, and said body member further including arcuate hook portions, said recessed portion adapted to receive the eye of said screw member, the shoulders adapted to be engaged by the end portions of the pin, and the end surfaces adapted to be engaged by said cams, said flat surfaces of said cams when said pin is rotated so that said handle is contiguous to said screw member permitting passage of said eye into and out of said body member recessed portion.

References Cited in the file of this patent

UNITED STATES PATENTS

| | | |
|---|---|---|
| 884,315 | Carroll | Apr. 7, 1908 |
| 1,110,011 | Schneider | Sept. 8, 1914 |
| 1,428,060 | Reinboth | Sept. 5, 1922 |
| 2,257,330 | Brouwer | Sept. 30, 1941 |
| 2,301,625 | Johnson | Nov. 10, 1942 |

FOREIGN PATENTS

| | | |
|---|---|---|
| 663,646 | Great Britain | Dec. 27, 1951 |